May 14, 1957 — E. L. BYRKETT — 2,792,569
GAUGING DEVICE
Filed Dec. 29, 1953 — 2 Sheets-Sheet 1
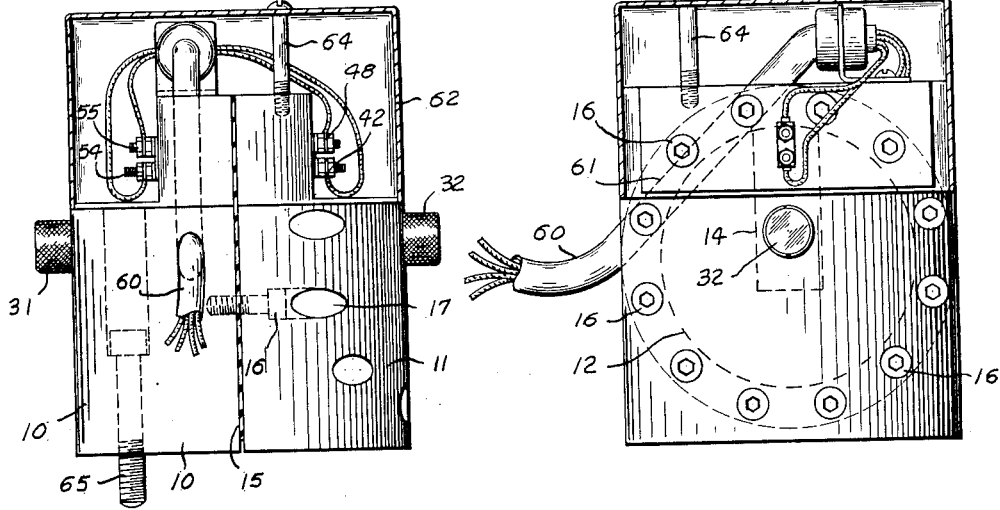
Fig-1
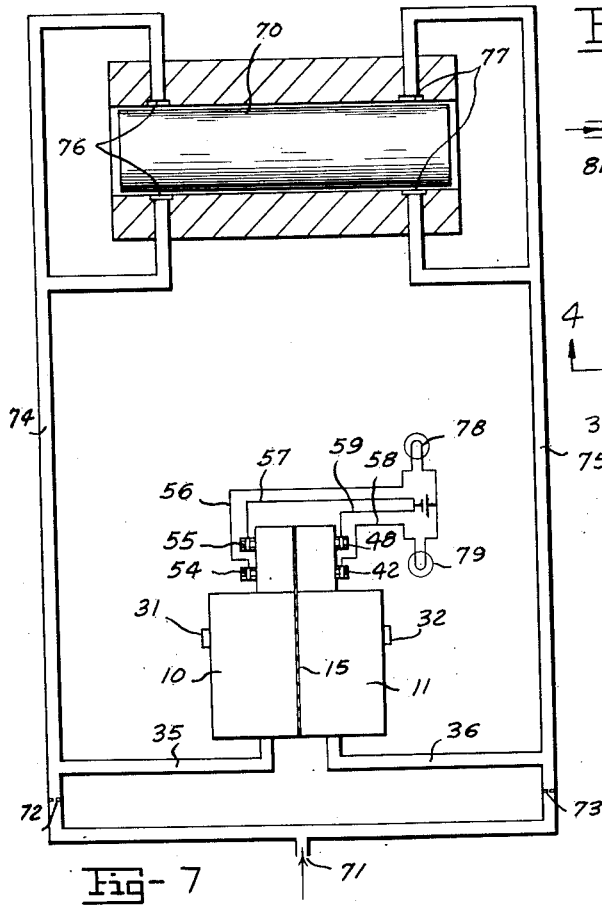
Fig-7
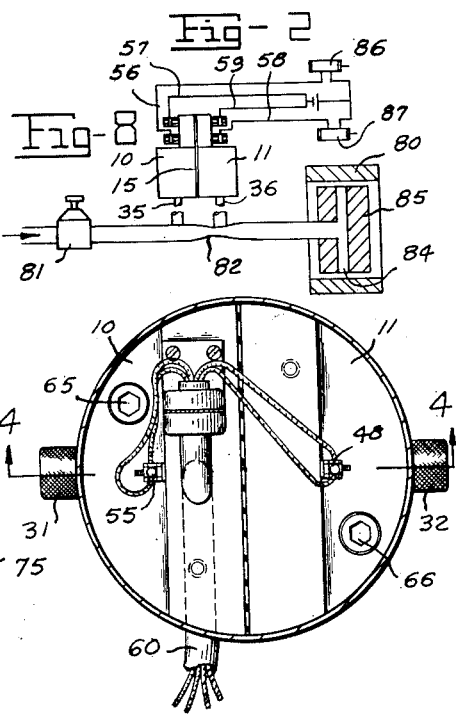
Fig-2
Fig-8
Fig-3
INVENTOR.
E. L. Byrkett
BY Edward J. Noé Jr.
atty May 14, 1957 E. L. BYRKETT 2,792,569
GAUGING DEVICE Filed Dec. 29, 1953 2 Sheets-Sheet 2

INVENTOR.
E. L. Byrkett
BY Edward J North
atty

United States Patent Office 2,792,569
Patented May 14, 1957

2,792,569

GAUGING DEVICE

Elwood L. Byrkett, Dayton, Ohio, assignor, by mesne assignments, to The Sheffield Corporation, a corporation of Delaware Application December 29, 1953, Serial No. 400,937

5 Claims. (Cl. 340—265)

This invention is directed to the field of gauges and more particularly to a gauge for gauging pressure differences of air or the like.

It is an object of this invention to provide a gauge having separate chambers independently connected to two pressure sources, and having switch means in each chamber responding to predetermined differences in the pressure in the chambers regardless of which chamber has the greater pressure.

It is a further object to provide a differential pressure gauge of such character wherein the pressure difference to which the gauge responds in each sense is independently adjustable as desired.

It is a further object to provide a differential pressure gauging unit responsive to predetermined differences in pressure between two pressure sources as determined by product or process characteristics for converting those pressure differences into electrical signals for operating indicating devices, for machine control, and like functions.

It is a further object to provide a differential pressure gauge comprising a flexible diaphragm interposed between two pressure tight chambers adapted for connection to fluid pressure sources, each of the chambers containing a compact switch unit responsive to a predetermined diaphragm deflection in one direction, the chambers being of limited volume for fast gauging response to pressure changes.

It is a further object to provide a differential pressure gauging unit comprising a flexible diaphragm interposed between two pressure tight chambers adapted for connection to fluid pressure sources, each chamber containing a compact switch unit comprising two cooperating switch contacts, one of which is responsive to a predetermined diaphragm deflection in a given direction and the other of which is adjustable in position to determine the pressure difference in a given sense to which the unit responds.

Other objects and advantages of the invention will be apparent from the following description, the appended claims, and the accompanying drawings, in which, Figure 1 is a view of an illustrative embodiment of a gauging unit embodying the features of this invention shown as viewed along the edge of the centrally supported pressure responsive diaphragm and with the upper housing portion broken away in central section.

Figure 4:
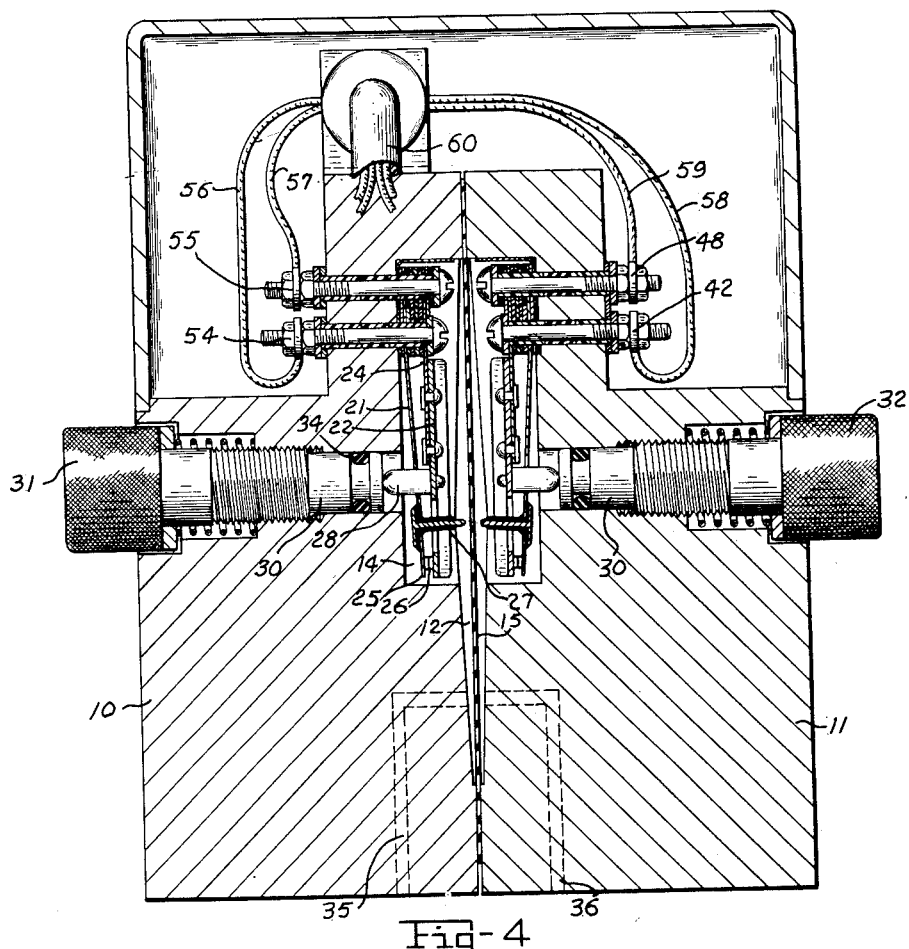
Figure 5:
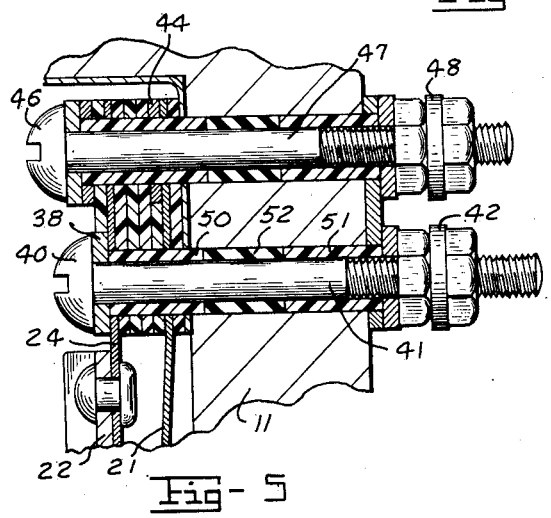
Figure 6:
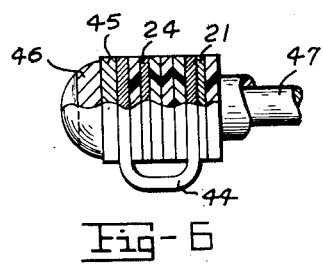

Figure 2 is a view similar to that of Figure 1 but rotated 90 degrees about the axis of the gauging unit from the position of Figure 1, Figure 3 is a view of the upper portion of the gauging unit with the upper housing sectioned, Figure 4 is a central section taken on line 4—4 of Figure 3, Figure 5 is a detailed central section of the switch unit support and electrical connecting structure, Figure 6 is a detail view, partially broken away, of a portion of the structure of Figure 5, Figure 7 is a diagrammatic illustration of one application of the gauging unit of this invention as applied to gauging the taper of a pin by pressure gauging means, and Figure 8 is a diagrammatic illustration of the gauging of this invention as applied to the gauging of tthe diameter of a hole in a workpiece through a fluid flow gauging method and including controllable relays responsive to the workpiece hole diameter for controlling a machine or the like.

The gauging unit of this device is one provided for gauging differences in pressure between two pressure sources. It is adjustable to respond to two different pressure relationships between the sources. In one application it may be adjusted to respond to one pressure differential when a first of the pressures is greater than the second and another pressure differential when the second pressure is greater than the first. Each pressure differential to which the unit will respond is independently adjustable. The unit can be used to sense pressure differentials as determined by a product or process characteristic and to convert these pressure differentials into electrical signals for use in actuating indicating means, product selection or classification structure, or for machine control.

In the embodiment disclosed for the purpose of illustrating the features of the present invention the gauging unit comprises two pressure chambers situated on opposite sides and in sealed relationship with a flexible diaphragm. Each of the chambers is connected to one of the pressure sources the pressure relationship of which is to be gauged. A pair of switch contacts is carried in each of the chambers one of which is adjustably fixed in position during a gauging operation and determines the pressure differential to which that pair of contacts responds and the other of which is operatively associated with the flexible diaphragm for acutation upon flexures thereof.

In the specific embodiment illustrated the gauging unit comprises two half cylindrical housing sections 10 and 11 which have stepped upper ends and depressions in their mating faces which form pressure chambers when the housing sections 10 and 11 are assembled about an intermediate diaphragm. The depressions in the mating faces of each of the housing sections are of similar configuration and as indicated in the housing section 10 comprise a conical portion 12 of limited depth and circular outline and a substantially rectangular portion 14 which is elongated and lies along a portion of a diameter of the conical section 12. The rectangular portion 14 is formed as a deepened enlargement of the conical portion 12 and extends from the periphery thereof inward a short distance beyond the center part of the conical portion 12, the major portion of the rectangular chamber portion 14 lying to one side of the center part of the conical portion 12. The housing sections 10 and 11 are assembled about a diaphragm 15 with their depressions in facing relationship and in sealed engagement with the diaphragm 15 to form pressure chambers at each side of the diaphragm 15. The housing sections 10 and 11 and the diaphragm 15 are clamped together in pressure tight relationship by a number of bolts spaced radially outward from the periphery of the conical chamber 12 and distributed therearound. The heads of the bolts 16 are seated in counterbored holes in the housing element 11. The bolts 16 pass through diaphragm 15 and their inner ends are threaded into the housing element 10 for clamping purposes.

Similar switch means are carried within the elongated chamber portion 14 of each of the housing sections 10 and 11. Each of the switch means comprises a pair of switch arms 21 and 22 which lie in and along the corresponding elongated chamber portion and are suspended from the respective housing section at their outer ends.

The inner arm 22 in each instance is formed of a rigid channel section which is suspended at its outer end for movement and with a resilient bias away from the diaphragm by a spring leaf 24. The outermost arm 21 is formed as a resilient spring leaf and has a bias toward the diaphragm 15. At their inner ends the switch arms 21 and 22 carry opposing and engageable switch contacts 25 and 26 respectively.

Immediately above its lower contact 25 the resilient arm 21 has a projecting engagement means 27 which passes through the innermost arm 22 and is directed toward the adjacent face of the diaphragm 15. Substantially intermediate the ends of the innermost arm 22 and fixed to the rigid channel section thereof is an engagement means 28 which projects outward away from the diaphragm 15, through the outermost arm 21, and into engagement with the threaded inner end of an adjustable spindle 30 which is threaded into the associated housing section for adjustment toward and from the diaphragm 15. The outer portion of the spindle 30 which is carried in the housing section 10, has a knurled knob 31 for manually rotating the spindle 30 to adjustably position the innermost arm 22 within the pressure chamber and with respect to the diaphragm 15. The corresponding knurled knob portion for the spindle carried within the opposing housing section 11 is indicated at 32. The inner end of each adjustable spindle is sealed with respect to the corresponding housing section by a sealing ring one of which is indicated at 34.

In ordinary operation when pressures are equal on opposite sides of the flexible diaphragm 15 the diaphragm is in an intermediate position and the outer arm projecting engagement means 27 are spaced away from the diaphragm. This facing is determined by the adjusted position of the innermost arm 22 of each pair of arms in accordance with the respective axial positions of the spindles 30 in the housing sections 10 and 11. Because the switch contacts 25 and 26 are urged resiliently together movements of the inner arm 22 will also serve to position the outermost arm 21 therewith. The adjusted position of the outermost arm engagement means 27 in each instance with respect to the adjacent face of the diaphragm 15 determines the necessary flexure of the diaphragm 15 to engage the engagemet means 27 to move the outermost arm to which it is fixed outward and to separate the switch contacts 25 and 26. Thus it is seen that by rotating the knobs 31 and 32 the switch means in each respective pressure chamber can be adjusted to respond to a different pressure differential between the pressure sources.

Pressure is led to the respective pressure chambers in the housing sections 10 and 11 through conduits 35 and 36 respectively. Thus if the pressure in the conduit 36 is greater than that in conduit 35, the flexible diaphragm 15 will flex to the left. If the pressure by which the pressure in conduit 36 exceeds that in conduit 35 is of the predetermined amount for which the adjustment of the switch means in housing section 10 has been made, the diaphragm will flex until it engages the projecting engagement means 27 and open the switch contacts 25 and 26. Conversely if the pressure 35 exceeds that in conduit 36 the diaphragm 15 will be flexed to the right as viewed in Figure 4 until it opens the switch contacts in the switch means of the housing section 11 as determined by the adjustment made to the knob 32. It will be apparent to those skilled in the art that the gauging unit of this invention is also readily adaptable for closing the associated switch contacts upon a predetermined pressure differential or for actuating each of the switch means in turn as one of the pressures exceeds the other by two different predetermined amounts.

The switch arms 21 and 22 are of electrical conducting material as are the electrical contacts 25 and 26. Figure 5 illustrates in detail how the switch arms 21 and 22 are mounted in their respective housing sections and the manner in which an electrical circuit is completed to the switch contacts 25 and 26 through the switch arms 21 and 22. The electrical circuit to the switch arm 22 is completed through the resilient leaf portion 24, a washer 38 of conducting material which engages the head 40 of a conducting bolt 41, which passes through the innermost arm 21 and is insulated relative thereto, and out through the housing section 11 to a terminal connection provided at 42. The upper end of the resilient arm 21 engages a conducting means 44 formed as a strap around the upper continuation of the arm 22. At its other end this strap 44 is in electrical contact with a conducting washer 45 which engages the head of a bolt 46. The bolt 46 passes through the upper end of the spring leaf continuation 24 of the inner arm 23 and insulated relative thereto. Bolt 46 leads to a terminal connection provided at 48.

Each of the conducting and mounting bolts 47 and 41 have three concentric aligned sleeve portions interposed between their outer surfaces and the housing section 11, which comprise, as indicated for the bolt 41, two outer sections 50 and 51 of the solid plastic material and an inner section of rubber or the like, indicated at 52. Thus it is seen that when the bolt 41 is drawn tightly the inner sleeve section 52 would be expanded to effectively seal the pressure chamber.

The terminal connections for the switch means in the housing section 11 have been indicated at 48 and 42. The corresponding terminal connections for the switch means within the housing section 10 are indicated at 54 and 55. The electrical wires 56 and 57 connected to terminals 54 and 55 respectively and wires 58 and 59 connected to terminals 42 and 48 respectively are gathered together within conduit 60 which passes diagonally through the housing section 10 as indicated at 61 in Figure 2 and to the exterior of the gauging unit of this invention. It is seen that the upper portion of the unit is sealed by a cup-shaped housing member 62 seated at its lower end in an annular groove continuing about the housing sections 10 and 11. Housing member 62 is fastened to the upper end of housing section 11 by bolts one of which is indicated at 64. The entire unit is adapted for mounting vertically from a horizontal surface by bolts 65 and 66 having their heads seated in counterbores in the housing sections 10 and 11 respectively.

The pressure chamber portions 12 and 14 of this invention have a unique arrangement whereby rapid response of the gauging unit to differentials in pressure is assured. For a rapid response pressure chambers of limited volume have been provided at each side of the flexible diaphragm 15. In applicant's arrangement the diaphragm 15 flexes within relatively shallow depressions and the switches are carried in a deepened enlargement of this depression which has only the necessary dimensions to carry the compact switch arrangement. The chamber portion 14 is of limited width and depth and extends only from the periphery of the conical chamber portion 12 and inward for a limited extent to the other side of the center point thereof. It should also be noted in the illustrative example that because the projecting engagement means 27 and 28 on arms 21 and 22 cross in opposite directions at points between the switch contacts 25 and 26 and the mounted ends of these switch arms a compact arrangement is achieved requiring little containing space. By rotating the knobs 31 and 32 the amount of lost motion in the movements of the diaphragm 15 before it engages the projecting engagement means 27 for either of the switch means can be adjusted as desired in order to secure the pressure response required for the particular operation.

As previously mentioned the gauging unit of this invention is adapted for application wherever pressure differences are to be measured and converted into electrical signals. Exemplary applications of this gauging unit are disclosed diagrammatically in Figures 7 and 8.

In Figure 7 the gauging unit is employed in a pressure gauging system to actuate signal lights in accordance with predetermined taper relationships of a workpiece 70. Air under pressure is supplied to this system through a connection 71 and divides for flow through two identical system branches. Air passes through orifice openings 72 and 73 into pressure conduits 74 and 75 respectively. The pressure in the conduit 74 is determined by the amount of air which escapes through opposed orifice openings 76 as determined by the diameter of the workpiece at that end thereof. Correspondingly the pressure in the conduit 75 is determined by the leakage through orifice openings 77 which is controlled by the proximity of the surface of the workpiece 70 to the orifice openings and the diameter of workpiece 70 at that end. Connections 35 and 36 extend respectively from pressure conduits 74 and 75 to the corresponding pressure chambers within the gauging unit in housing sections 10 and 11. Remembering that the gauging head of this invention responds only to pressure differentials it can be seen that knobs 31 and 32 can be adjusted to respond to different taper conditions of the workpiece 70. For example if the lefthand end of the pin 70 as shown in Figure 7 is larger than the righthand end, the pressure in conduit 74 will be greater than that in 75 because the leakage through orifice opening 76 will be more restricted. Thus the pressure chamber in the housing section 10 of Figure 7 will be subjected to the greater pressure and the diaphragm 15 will flex to the right. By adjusting knob 32 the lost motion necessary in the movement of the diaphragm 15 to the right before it engages the switch means projection and opens the switch contact can be adjusted as desired so the unit will respond to a predetermined taper condition of the workpiece pin 70 in this direction. Conversely, knob 31 can be adjusted so that the gauging unit will respond to any desired taper condition wherein the righthand end of the pin 70 is larger than the lefthand end, as viewed in Figure 7. Lights 78 and 79 are provided in a simple electrical circuit in this illustrative example. These lights 78 and 79 will be lighted before a workpiece is applied in the particular application illustrated. After the workpiece 70 has been inserted between the nozzle pairs 76 and 77 if the taper condition in either direction is equal to or above that to which the gauging unit is set, one or the other of the lights 78 and 79 will go out indicating that the taper of the workpiece 70 is of a predetermined degree and also indicating the direction in which it tapers.

In the application of Figure 8 the gauging unit is adapted to respond to two different diametral dimensions of a hole in a work part 80. Air is supplied to the gauging system through a regulator 81, passes through a venturi 82 and out to opposed leakage orifices 84 in a gauge head 85. The velocity of the flow through the venturi 82 is controlled by the proximity of the hole surface in the workpiece 80 to the orifice openings 84. Conduits 35 and 36 are connected to the enlarged and throat sections of the venturi 82 respectively in order that pressure differences across the diaphragm 15 in the gauging unit will be in accordance with the velocity of flow through the gauging head 85 and the dimension of the hole in the workpiece 80. It will also be seen in this exemplary application that relays 86 and 87 have been provided which could be situated in the control circuit of a grinding machine, a part selecting or segregating mechanism, or for other similar applications.

It should be noted that this gauging unit is not restricted to an application where one pressure is greater than the other by a predetermined amount or vice versa but could be adjusted to respond by opening or closing contacts when one pressure exceeds the other by two predetermined amounts. In such a condition the unit could be utilized to actuate one set of switch contacts when one pressure exceeds the other by one pressure differential and to actuate the other set of switch contacts when the one pressure exceeds the other by still another pressure differential.

Because the gauging unit of this device responds only to pressure differentials the absolute magnitude of the pressure is not critical. Also the pressure differential between the pressure forces can exceed the adjusted limits of the unit without damaging it because the flexible diaphragm 15 will simply flex to one side or the other of the conical chamber portions in which it is suspended and be held there by an excessive pressure difference without damage.

It is thus seen that a gauging device for pressure differentials has been provided which is simple and rugged in construction and useful for a long service life and repeated accurate gauging operations. Because the switch arrangements provided in each of the chambers are compact in size and the volume of the pressure chambers themselves are restricted fast response will be obtained. The device will respond to two predetermined pressure differential conditions as is desired. Because the unit of this invention is readily adjustable for accurate response it has special utility in air circuits for gauging part sizes or for like functions. The illustrated and described applications of the unit are intended only to indicate the range of uses possible with the unit of this invention.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A unit for gauging differences in pressure between two pressure sources comprising a unit body providing a pressure-tight compartment, a flexible diaphragm in said compartment in sealed relationship therewith and forming two pressure chambers, one on each side of said diaphragm, each chamber throughout its major portion being of shallow conical form to provide an extended area of support for the diaphragm at a predetermined maximum deflection thereof, a first switch contact in each chamber, a resilient arm carrying each first switch contact in its respective chamber with a bias inward toward the adjacent side of the diaphragm, each arm including engagement means extending toward the diaphragm positioned for operative engagement by said diaphragm upon a predetermined flexure thereof toward the respective first contact, whereby the first contact is moved outward in response to a predetermined pressure difference between the chambers, a second switch contact in each of said chambers carried in opposing engageable relationship to the associated first contact and between the associated first contact and the adjacent side of the diaphragm, means for adjustably setting the position of the second contact in each respective chamber, whereby the position of the respective first contact and the clearance of the associated engagement means relative to the adjacent side of the diaphragm is determined, a separate connection to each chamber adapted for connection to a source of fluid under pressure and electrical means having an electrical connection with the pair of contacts in each chamber and responsive to actuations of the first switch contacts in response to flexures of the diaphragm through a range in either direction as determined by the set position of the second contact in each chamber and predetermined pressure differences between the chambers.

2. A unit for gauging differences in pressure between two pressure sources comprising a pair of housing sections, each having a depression in one face thereof, a flexible diaphragm, means fastening the two housing sections together about the flexible diaphragm in sealed relationship therewith with their depressions in facing relationship thereby forming two pressure chambers, one on each side of the flexible diaphragm, each chamber throughout its major portion being of shallow conical form to provide an extended area of support for the diaphragm at a predetermined maximum deflection thereof, a separate connection to each chamber adapted for connection to a source of fluid under pressure, a pair of switch contacts in each of said chambers spaced outwardly at different distances with respect to the adjacent face of said diaphragm, means supporting the innermost contact of each pair in its respective chamber, independent means for adjustably setting the position of each inner contact relative to the diaphragm, resilient means carrying each of the outermost contacts for movement, engagement means connected with each of said resiliently supported contacts for engagement with the respective side of the flexible diaphragm upon a predetermined pressure difference between said chambers and a predetermined flexure of the flexible diaphragm to open a pair of said switch contacts and carry the outer switch contact outward with the diaphragm upon further increase in the pressure difference, each of said chambers throughout a minor portion being enlarged outwardly beyond its generally shallow conical form and receiving the respective pair of switch contacts and their supporting and carrying means, and electrical means electrically connected with the pair of contacts in each chamber responsive to the actuations of the contacts.

3. A unit for gauging differences in pressure comprising a pair of housing sections each having chamber forming depressions in one face thereof, a flexible diaphragm, means fastening the housing sections together about said flexible diaphragm in sealed relationship therewith with the depressions in facing relationship thereby forming first pressure chamber portions at each side of the diaphragm in which said diaphragm is carried for limited flexing movements, each first chamber portion being of limited depth and forming a substantially conical chamber when said diaphragm is unflexed, a separate connection to each first chamber portion adapted for connection to a source of fluid under pressure, an elongated second chamber portion in each of said housing sections formed as a deepened enlargement of the respective first chamber portion and disposed radially therealong, the major portion of each of the second chamber portions being disposed at one side of the center point of the operative section of the diaphragm and the surface of the respective first chamber extending more than 180 degrees about its center to join the second chamber portion for contacting substantially the entire area of the adjacent side of the diaphragm to limit its flexure at a predetermined point and pressure difference, switch means carried in each second chamber portion comprising a projecting switch actuating member extending into the associated first chamber portion for engagement with a central portion of the adjacent side of the diaphragm to move outward with the diaphragm and actuate the associated switch means upon a predetermined flexure of said diaphragm in one direction and a predetermined pressure difference between said chambers, adjustable means in each switch means for determining the pressure difference to which the respective switch means will respond and electrical means electrically connected with the switch means in each chamber responsive to the actuation thereof.

4. A unit for gauging differences in pressure comprising a pair of housing sections each having a shallow depression of substantially conical form in one face thereof, a flexible diaphragm, means fastening the housing sections together about said flexible diaphragm in sealed relationship therewith with the depressions in facing relationship thereby forming first pressure chamber portions at each side of the diaphragm of a shallow substantially conical form when the diaphragm is unflexed and in which said diaphragm is carried for limited flexing movements, a separate connection to each first chamber portion adapted for connection to a source of fluid under pressure, an elongated second chamber portion in each of said housing sections formed as a deepened enlargement of a minor portion of the respective first chamber portion and disposed along a portion of a diameter thereof, the major portion of each of the second chamber portions being disposed at one side of the center point of the respective first chamber portions and the extreme flexures of the diaphragm in either direction being limited by the engagement of substantially the entire area of the diaphragm with the wall of the respective first chamber portion; switch means carried in each second chamber portion comprising a pair of arms disposed along the second chamber portion and spaced outwardly at different distances from the adjacent face of said diaphragm, the innermost arm of each pair being rigid in form, means supporting each inner arm at its outer end in its chamber portion for movement toward and from the diaphragm and with a resilient bias away from the diaphragm, means supporting each of the outermost arms of each pair at its outer end in its chamber portion for movement toward and from the diaphragm and with a resilient bias toward the diaphragm, opposed switch contacts carried by each pair of arms, projecting engagement means fixed to each outer arm extending toward the adjacent face of the diaphragm for engagement thereby, adjustable means cooperating between each housing section and the respective inner arm for adjusting the position of the inner arm relative to the diaphragm, and electrical means electrically connected with the switch means in each chamber responsive to actuations thereof.

5. A unit for gauging differences in pressure comprising a pair of housing sections each having a shallow depression of substantially conical form in one face thereof, a flexible diaphragm, means fastening the housing sections together about said flexible diaphragm in sealed relationship therewith with the depressions in facing relationship thereby forming first chamber portions at each side of the diaphragm of a shallow substantially conical form when the diaphragm is unflexed and in which said diaphragm is carried for limited flexing movements, a separate connection to each first chamber portion adapted for connection to a source of fluid under pressure, and an elongated second chamber portion in each of said housing sections formed as a deepened enlargement of a minor portion of the respective first chamber portion and disposed along a portion of a diameter thereof, the major portion of each of the second chamber portions being disposed at one side of the center point of the respective first chamber portion and the extreme flexures of the diaphragm in either direction being limited by the engagement of substantially the entire area of the diaphragm with the wall of the respective first chamber portion; switch means carried in each second chamber portion comprising a pair of arms disposed along the second chamber portion and having lengths substantially equal to that of the elongated chamber in which they are carried, said arms being spaced outwardly at different distances from the adjacent base of said diaphragm, the inner-most arm of each pair being rigid in form, means supporting each inner arm at its outer end for movement toward and from the diaphragm and with a resilient bias away from the diaphragm, means supporting each of the outer-most arms of each pair at its outer end for movement toward and from the diaphragm and with a resilient bias toward the diaphragm, opposed switch contacts carried by each pair of arms at their inner ends, projecting engagement means fixed to each outer arm extending through the associated inner arm and into the respective first chamber portion toward the central portion of the adjacent face of the diaphragm for engagement thereby, each inner arm having an opening through which the engagement means passes with clearance, an adjustment projection fixed to each inner arm extending through the associated outer arm and away from the adjacent face of the diaphragm, each outer arm having an opening through which the adjustment projection passes with clearance, an adjustment spindle threaded into each housing section and engaging the respective adjustment projection for adjusting the position of the inner arm within its second chamber portion, whereby the position of each outer arm and the normal clearance of the associated projecting engagement means with respect to the adjacent face of the diaphragm is also determined, each engagement means being engageable upon a predetermined flexure of the diaphragm to move the associated outer arm outward and open the respective pair of switch contacts.

References Cited in the file of this patent

UNITED STATES PATENTS

| | | |
|---|---|---|
| 2,390,252 | Hayward | Dec. 4, 1945 |
| 2,448,653 | Aller | Sept. 7, 1948 |
| 2,571,557 | Fortier | Oct. 16, 1951 |
| 2,614,424 | Thoresen | Oct. 21, 1952 |